United States Patent
Bae et al.

(10) Patent No.: US 8,250,606 B2
(45) Date of Patent: *Aug. 21, 2012

(54) DIGITAL TELEVISION AND CHANNEL EDITING METHOD THEREOF

(75) Inventors: Sang Chul Bae, Daegu-si (KR); Ick Hwan Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,613

(22) Filed: Dec. 14, 2009

(65) Prior Publication Data

US 2010/0186045 A1    Jul. 22, 2010

Related U.S. Application Data

(63) Continuation of application No. 10/421,710, filed on Apr. 24, 2003.

(30) Foreign Application Priority Data

Dec. 10, 2002   (KR) ................................ 2002-78294

(51) Int. Cl.
    *G06F 13/00*        (2006.01)
    *H04N 5/50*         (2006.01)

(52) U.S. Cl. ............ 725/46; 725/38; 725/39; 725/40; 725/41; 725/43; 725/44; 725/45; 725/47; 725/52; 725/56; 725/61; 348/570; 348/569; 348/634; 348/731

(58) Field of Classification Search .............. 725/37–61; 348/564
See application file for complete search history.

(56) References Cited

U.S. PATENT DOCUMENTS

| | | | | |
|---|---|---|---|---|
| 5,045,946 A | * | 9/1991 | Yu ................................. | 348/565 |
| 5,093,726 A | * | 3/1992 | Chun ........................... | 348/565 |
| 5,594,509 A | | 1/1997 | Florin et al. | |
| 5,652,628 A | | 7/1997 | Toyoshima et al. | |
| 5,682,207 A | | 10/1997 | Takeda et al. | |
| 5,867,227 A | * | 2/1999 | Yamaguchi .................... | 725/56 |
| 5,900,868 A | * | 5/1999 | Duhault et al. ................ | 725/42 |
| 6,118,493 A | * | 9/2000 | Duhault et al. ............... | 348/564 |

(Continued)

FOREIGN PATENT DOCUMENTS

CN        1156378 A     8/1997

(Continued)

OTHER PUBLICATIONS

Chinese Notification for Re-examination dated Sep. 29, 2008 for invention No. 03/22439.3.

*Primary Examiner* — Jun Fei Zhong

(74) *Attorney, Agent, or Firm* — Birch, Stewart, Kolasch & Birch, LLP

(57) ABSTRACT

A method and display device for displaying images are discussed. According to an embodiment, there is a method for displaying images using a display device, the display device including a memory, a display screen, and a controller for controlling the memory and the display screen, the method comprising: storing, in the memory, channel information pertaining to a predetermined number of broadcast channels; and displaying, on the display screen, a multi-window including a plurality of sub-windows, each of the plurality of sub-windows configured to display images from a different one of the broadcast channels, wherein a number of the sub-windows displayed on the display screen is variable according to the channel information.

16 Claims, 9 Drawing Sheets

U.S. PATENT DOCUMENTS

| | | |
|---|---|---|
| 6,147,717 A | 11/2000 | Jun |
| 6,212,680 B1 | 4/2001 | Tsinberg et al. |
| 6,249,322 B1 | 6/2001 | Sugihara |
| 6,351,270 B1 * | 2/2002 | Nishikawa et al. ............ 715/717 |
| 6,529,246 B1 * | 3/2003 | Maeda .......................... 348/570 |
| 7,373,650 B1 | 5/2008 | Rodriguez et al. |
| 7,757,252 B1 * | 7/2010 | Agasse ........................... 725/41 |
| 2002/0067376 A1 | 6/2002 | Martin et al. |
| 2002/0166122 A1 * | 11/2002 | Kikinis et al. .................. 725/56 |
| 2003/0179320 A1 | 9/2003 | Kim |
| 2005/0149972 A1 | 7/2005 | Knudson |
| 2006/0064719 A1 | 3/2006 | Youden |
| 2010/0091191 A1 | 4/2010 | Bae et al. |
| 2010/0182506 A1 | 7/2010 | Bae et al. |

FOREIGN PATENT DOCUMENTS

| | | |
|---|---|---|
| CN | 1204210 A | 1/1999 |
| CN | 1414780 A | 4/2003 |
| DE | 3920119 A | 12/1989 |
| EP | 0 377 334 A2 | 7/1990 |
| EP | 0 617 556 A1 | 9/1994 |
| EP | 0 725 539 A2 | 8/1996 |
| EP | 0 865 202 A1 | 9/1998 |
| EP | 1 246 465 A2 | 2/2002 |
| GB | 2 222 048 A | 2/1990 |
| GB | 2 320 391 A | 6/1998 |
| JP | 1155593 A | 6/1989 |
| JP | 8149384 A | 6/1996 |
| JP | 9051487 A | 2/1997 |
| WO | WO-01/58162 A2 | 8/2001 |

* cited by examiner

DIGITAL TELEVISION AND CHANNEL EDITING METHOD THEREOF

This Application is a Continuation of co-pending U.S. patent application Ser. No. 10/421,710, filed Apr. 24, 2003, which claims priority under 35 U.S.C. §119 on Korean Application No. 10-2002-0078294 filed on Dec. 10, 2002. The entire contents of all these applications are hereby incorporated by reference in their entirety.

BACKGROUND OF THE INVENTION

1. Field of the Invention

The present invention relates to a digital television (TV), and more particularly, to a digital television and a channel editing method for the digital TV by which various channel information is edited efficiently.

2. Description of the Related Art

Generally, television (TV) is an apparatus that processes broadcast signals. Each of the broadcast signals carries a broadcast program (e.g., broadcast contents) and allows the TV audience to watch the broadcast program. The TV audience can get various kinds of information from watching the TV. The TV is one of the most representative media of multimedia apparatuses developed. As the technology of multimedia develops, digital manner is substituted for analog manner more and more.

A digital TV replays all the information of video, audio and data of broadcast programs processed digitally in the original video and audio signals. Such a digital TV is immune to noise compared to an analog TV, needs a low transmission power, can employ the error correction technology, and is easy to search, process and edit information.

Particularly, the number of channels of the current digital TV through which broadcast programs are transmitted can be expanded as ten times as that of analog channels. TV audience can view various information through each of the channels so that the desire of the TV audience for certain information can be satisfied completely.

As described above, the digital TV can search, process and edit the broadcast programs (channels). The TV audience can register or delete the broadcast programs according to their need or desire. Whenever necessary, a TV viewer can register his or her favorite channels) using a remote control and can watch the favorite channel at any time.

FIG. 1 illustrates a block diagram of a general digital TV.

Referring to FIG. 1, the general digital TV includes a single tuner 1 for selecting a broadcast signal, a demultiplexer 2 for demultiplexing the broadcast signal selected by the tuner 1 (i.e., a transport stream multiplexed in time domain), an image processor 3 for performing image processing so as to display the broadcast signal demultiplexed by the demultiplexer 2, a display unit 4 (e.g., screen) for displaying the processed image signal, a key inputting unit 5 for inputting a user's request command and operation-related commands, and a microcomputer 6 for outputting corresponding control signal(s) according to the command inputted by the key inputting unit 5 and controlling the tuner 1, the demultiplexer 2 and the image processor 3 of FIG. 1.

FIG. 2 is a flowchart to illustrate a general channel editing method for the digital TV of FIG. 1.

Referring to FIG. 2, it is determined whether a user has selected a channel edit menu using a remote control or the like (S11). The channel previously selected by the user is displayed on the display unit 4 before the user selects the channel edit menu (S14). In other words, the channel that the user has selected before the digital TV is turned on is memorized. Then, the selected channel is tuned and displayed on the display unit 4 when the digital TV is turned on.

At step S11, when the user selects the channel edit menu, a channel edit screen 24 such as one shown in FIG. 3 is displayed (S17) on the display unit 4. In other words, as shown in FIG. 3, a channel map 22 identifying the current channel and all other channels using channel numbers in series is displayed on the channel edit screen 24 (S20). The current channel may be the channel that is being broadcast now or the channel changed by the user, and is identified using block highlights. The broadcast on the current channel is displayed in a channel broadcast area 20 of the channel edit screen 24. Here, channel 2 is identified as the currently selected channel and the program on channel 2 is displayed in the channel broadcast area 20. The channel numbers memorized by an automatic tuning function or the like are displayed in bold, whereas the channel numbers that are not memorized are not displayed in bold. For example, in FIG. 3, the channel numbers 2, 7, 13, 14, etc. are displayed in bold compared to other channel numbers 3, 4, 5, 8, 9, 10, etc. According to this configuration, the user can see that the channel numbers 2, 7, 13, 14, etc. are the memorized channels or available channels. In addition, the channels set to be as favorite channels may have a predetermined mark (♥) next to their channel numbers.

Returning to FIG. 2, once the channel edit screen is displayed at steps S17 and S20, it is determined whether the user has inputted any predetermined key (S23) to select one of the bolded-channel numbers (memorized channels) from the channel edit screen. If the key for the desired channel number has been inputted, the broadcast signal corresponding to the channel number selected by the user is tuned and displayed in the channel broadcast area 20 of the channel edit screen (S26). Only one channel broadcast can be displayed in the area 20 at any given time. In the example of FIG. 3, the user has selected channel 2. Thus, the broadcast program on channel 2 is displayed in the broadcast area 20 of the channel edit screen 24.

Then, it is determined whether a channel edit key (function) is inputted by the user (S29). The process returns to step S26 if the channel edit key is not inputted.

But, if the channel edit key is inputted by the user, then the channel edit function according to the selected channel edit key is performed (S32). These channel edit functions may include memorizing and deleting selected channel number(s) and setting favorite channel(s).

When the channel edit function is completed, a channel end key is inputted by the user and the channel edit process is terminated (S35).

In the current broadcast, there are 69 wireless channels, 125 wire channels and 60 DTV channels. Accordingly, as shown in FIG. 3, the channel edit screen 24 displays all the channel numbers (2-46), and the brightness and darkness of channel numbers indicate whether or not a broadcast program is provided for the corresponding channel. In addition, predetermined marks are attached to those channel numbers of the user's favorite channels among the memorized channels so that the user can quickly recognize the user's favorite channels from other channels.

The above-discussed channel editing method, however, has the following problems.

First, when the user selects a channel edit menu, in the channel edit screen all the channels are displayed in the form of channel numbers and the broadcast image (or program) of only a single channel selected by the user is displayed in the channel broadcast area 20 as shown in FIG. 3. The broadcast situation/program of other channels then cannot be recognized at all unless the user moves through and selects each of the memorized channels one at a time from the channel edit screen. As a result, the channel edit process cannot be efficiently achieved.

Second, since there exist numerous channels due to the variety of media, it is wasteful in time and energy for the user to roll through the channel numbers.

SUMMARY OF THE INVENTION

Accordingly, the present invention is directed to a digital television and channel editing method thereof that substantially obviates one or more problems due to limitations and disadvantages of the related art.

In accordance with an embodiment of the present invention, a method for editing a plurality of channels for a display device, includes displaying broadcast signals for the plurality of channels in a multi-window in a channel edit mode; and editing the channels using the multi-window.

According to another aspect, the invention provides a method for displaying images using a display device, the display device including a memory, a display screen, and a controller for controlling the memory and the display screen, the method comprising: storing, in the memory, channel information pertaining to a predetermined number of broadcast channels; and displaying, on the display screen, a multi-window including a plurality of sub-windows, each of the plurality of sub-windows configured to display images from a different one of the broadcast channels, wherein a number of the sub-windows displayed on the display screen is variable according to the channel information.

According to another aspect, the invention provides a display device for displaying images, comprising: a memory configured to store channel information pertaining to a predetermined number of broadcast channels; a display screen configured to display a multi-window including a plurality of sub-windows, each of the plurality of sub-windows configured to display images from a different one of the broadcast channels; and a controller configured to control the memory and the display screen, wherein a number of the sub-windows displayed on the display screen is variable according to the channel information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
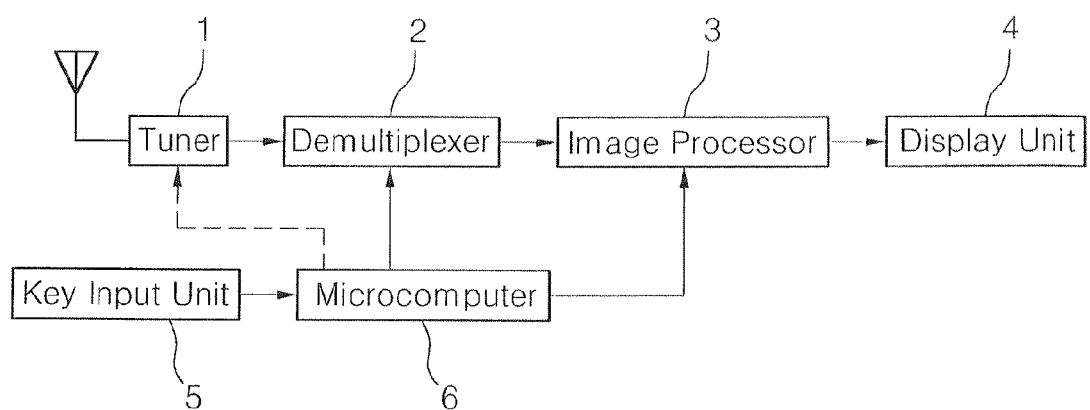
FIG. 1 illustrates a block diagram of a general digital TV.
Figure 2:
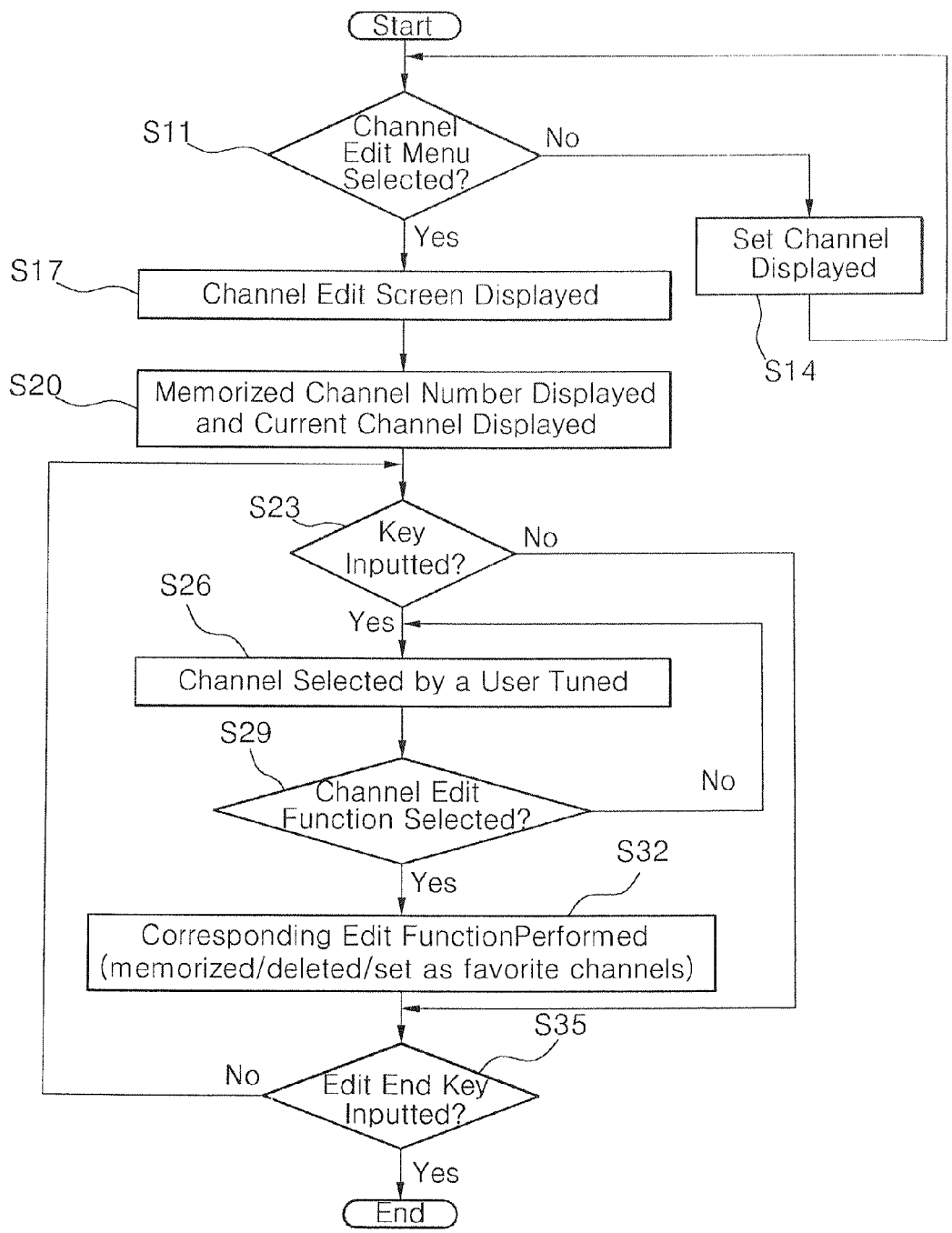
FIG. 2 is a flowchart illustrating a general channel editing method for the digital TV of FIG. 1.
Figure 3:
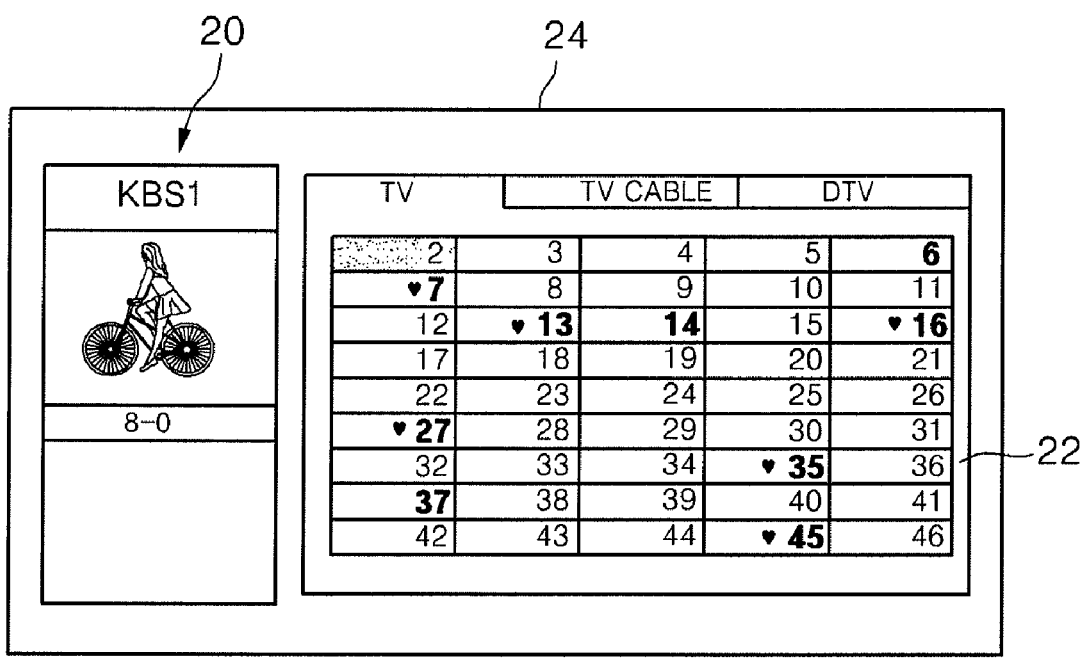
FIG. 3 shows an example of a channel edit screen of the digital TV of FIG. 1 according to the method of FIG. 2.

Reference will now be made in detail to the preferred embodiments of the present invention, examples of which are illustrated in the accompanying drawings. The same or like reference numerals are used to represent the same or like elements in the drawings.

Figure 4A:
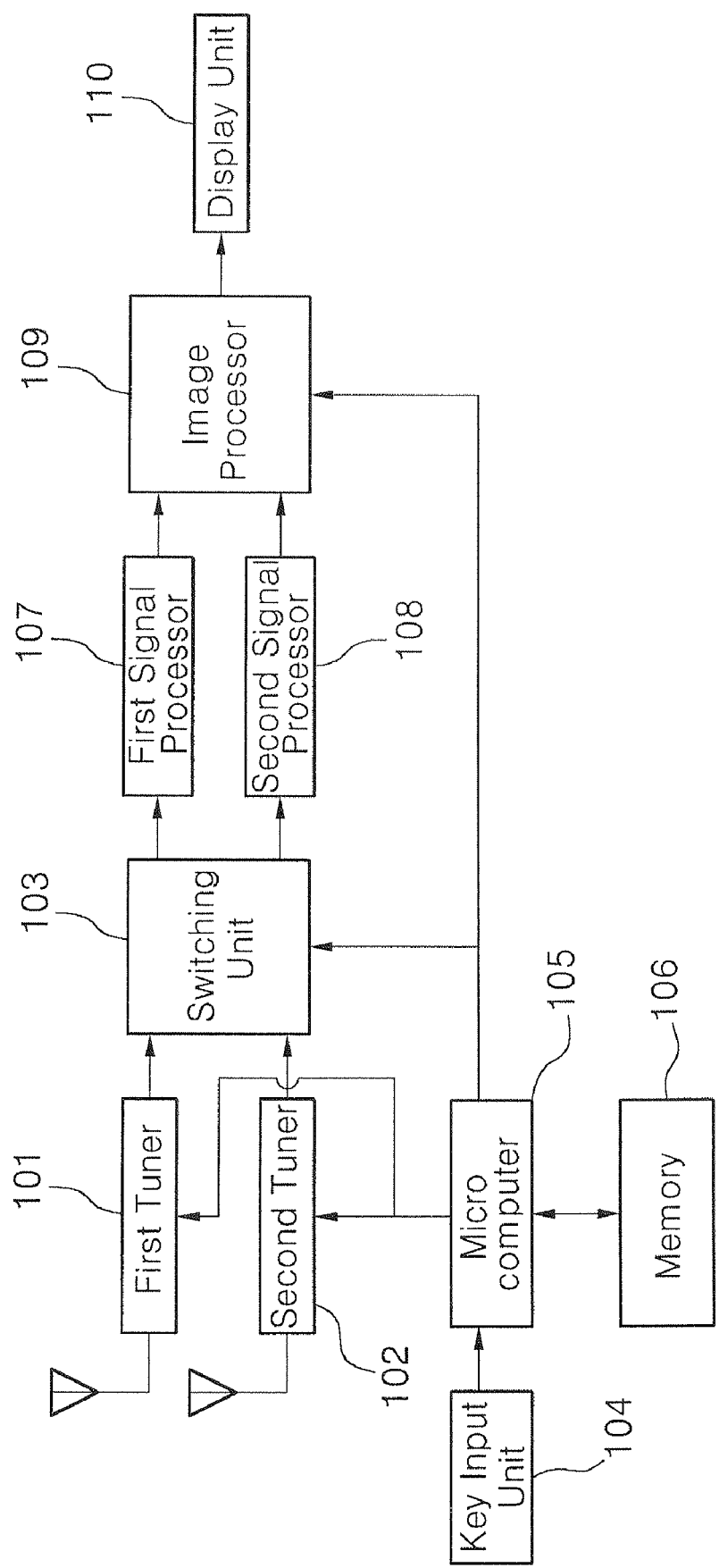
FIG. 4A is a block diagram of a digital TV according to a first embodiment of the present invention.

FIG. 4A is a block diagram of a digital TV according to the first embodiment of the present invention.

Referring to FIG. 4A, the digital TV according to the first embodiment of the present invention includes: first and second tuners 101 and 102 for tuning to different broadcast channels among the broadcast signals inputted through one or more antennas according to a user's request; a switching unit 103 for selectively outputting the broadcast signals tuned by the first and second tuners 101 and 102; a first signal processor 107 for processing the broadcast signal of the first tuner 101 selected by the switching unit 103 into a signal that can be displayed on a display unit 110 such as a screen; a second signal processor 108 for processing the broadcast signal of the second tuner 102 selected by the switching unit 103 into a signal that can be displayed on the display unit 110; a key input unit (user input unit) 104 for inputting request commands of a user and any other inputs; a microcomputer (controller) 105 for outputting control signals in response to the commands of the user (e.g., a channel edit command, a channel edit execution command, etc.); a storage or memory 106 for storing a standing (non-moving) picture of a channel automatically tuned by the second tuner 102 and set channel information; an image processor 109 for processing output signals of the first and second signal processors 107 and 108 according to the control signals of the microcomputer 105 to implement the output signals in the form of a multi-window or a single window; and a display unit 110 for outputting an image signal outputted by the image processor 109. All these components of the digital TV are operatively coupled.

The first tuner 101 tunes to only a single channel selected by the user (e.g., viewer). The second tuner 102 tunes automatically and sequentially (or in some predetermined order) to all other available channels, excluding the channel selected by the user, according to the control signals of the microcomputer 105.

The switching unit 103 selectively supplies the output of the first tuner 101 and the output of the second tuner 102 to the first signal processor 107 and the second signal processor 108, respectively. In other words, the broadcast signal outputted by the first tuner 101 is supplied to the first signal processor 107. The broadcast signal outputted by the second tuner 102 is supplied to the second signal processor 108.

The microcomputer 105 controls the image signals outputted by the first and second signal processors 107 and 108 so that they are displayed on the divided multi-window in response to a channel edit command inputted by the key input unit 104. In addition, the microcomputer 105 controls the second tuner 102 to automatically tune to all available channels other than the channel selected by the user through the key input unit 104. In this example, the second tuner 102 sequentially tunes to each of all other available channels for a certain time duration.

The operation of the digital TV as shown in FIG. 4A according to the first embodiment of the present invention will be described.

When the user selects a channel edit menu using the key input unit 104 (e.g., a remote control) while viewing the TV, the microcomputer 105 displays a multi-window screen in the form of a channel map having a predetermined number of sub-windows based on channel information stored in the memory 106 in response to the channel edit menu command inputted by the user.

Figure 5:
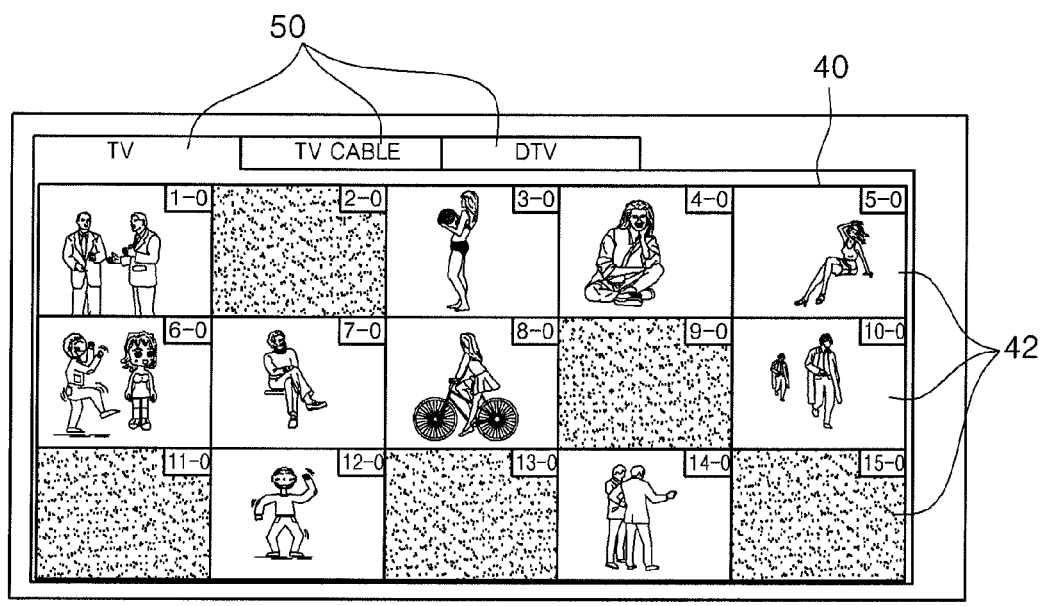
FIG. 5 shows an example of a channel edit screen of the digital TV according to the first embodiment of the present invention.

An example of such a multi-window screen for channel editing is shown in FIG. 5. As shown in FIG. 5, a multi-window 40 includes a list of all channel numbers and a plurality of sub-windows 42 each corresponding to one of the channel numbers. The multi-window 40 displays a broadcast program for each of certain available channels in the corresponding sub-window. Various schemes (e.g., different colors, different marks, different fonts, etc.) can be used to distinguish channel numbers as needed. For example, channel numbers can be displayed in different colors on the multi-window to distinguish the set (memorized) channels from other channels. In FIG. 5, the sub-windows 42 each have a channel identification 1-0, 2-0, 3-0, 4-0 ... 15-0 corresponding to different channels. The channel numbers 1-0, 3-0, 4-0, 5-0, 6-0, 7-0, etc. are displayed in red as the memorized channels but the channel numbers 2-0, 8-0, 10-0, 11-0, 12-0, etc. are displayed in yellow as the unset channels. The yellow channels have no programs currently being displayed (e.g., because there is no broadcast signal received from such channels). In another example, the border of each sub-window may be displayed in a different color to indicate the set and unset channels.

The channel information of the broadcast signals for the digital TV can change instantly. For example, a broadcast signal for channel 3 may be currently available. But it can happen that the broadcast signal for channel 3 is not detected or available after a certain time period elapses. Accordingly, to determine the broadcast situation for each channel, each channel is tuned frequently.

While the multi-window is displayed as described above, if the user operates an arrow key of the key input unit 104 to move the current channel selection to a different channel, the new channel selected is tuned by the first tuner 101. All other channels are tuned automatically and sequentially (or in some predetermined order) by the second tuner 102 for a predetermined time duration per channel. The tuned image signals are displayed on the corresponding sub-windows 42 of the multi-window 40.

According to the first embodiment of the digital TV of the present invention, the currently selected channel is successively tuned by the first tuner 101 and displayed in the corresponding sub-window as a moving picture. All other available channels are automatically and sequentially tuned by the second tuner 102 for a predetermined time duration per channel. For example, in FIG. 5, if the currently selected channel is channel 10-0, then a moving picture of the program for the selected channel 10-0 is displayed in the sub-window for channel 10-0. At the same or different time, from all other available channels 1-0, 3-0, 4-0, 5-0 ... etc., a moving picture of the program for channel 1-0 first will appear in the corresponding sub-window for a certain duration while all other available channels (except channels 1-0 and 10-0) will display blank or same default image in their sub-windows. After the duration ends, the picture on the sub-window for channel 1-0 will become static (frozen or non-moving status) while a moving picture of the program for the next available channel 3-0 will appear in the corresponding sub-window for a certain duration. After this duration ends, the picture on the sub-window for channel 3-0 will become static while a moving picture of the program for the next available channel 4-0 will appear in the corresponding sub-window. This moving picture-to-static picture switching procedure is repeated until the programs of all available channels are displayed in the corresponding sub-windows in static form. This process of displaying the channel programs for all available channels (except the currently selected channel) on the sub-windows is referred to herein as a "moving-to-static picture process". During this process, the moving picture of the program for the currently selected channel 10-0 is displayed continuously.

By viewing the multi-window as shown in FIG. 5, the user can instantaneously and easily recognize the current broadcast situation of all channels. Each available channel automatically tuned by the second tuner 102 is displayed as a moving picture when it is tuned first, but is displayed as a standing (static) picture when the next available channel is tuned by the second tuner 102. This procedure is applied to all the channels tuned by the second tuner 102.

Figure 4B:
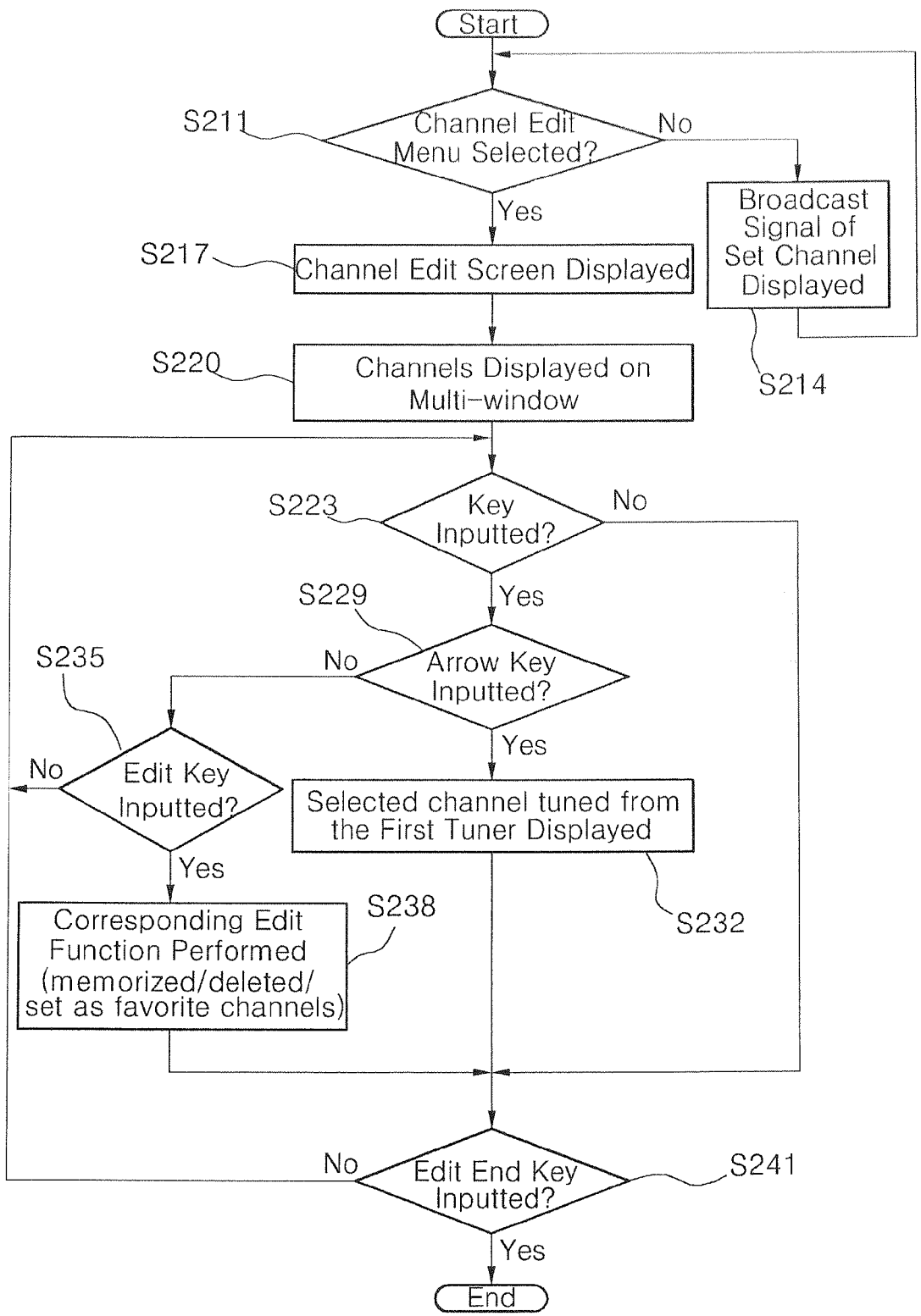
FIG. 4B illustrates a channel edit method of the digital TV according to the first embodiment of the present invention.

In more detail, FIG. 4B illustrates a channel edit method of a display device according to the first embodiment of the present invention. This method can be implemented in the digital TV of FIG. 4A or other types of display devices.

Referring to FIGS. 4A and 4B, when the digital TV is turned on, the broadcast signal of a default channel or the channel selected previously by the user is displayed on the display unit 110 before the operation of editing channels is performed.

Then, if the user selects a channel edit menu using the key input unit 104 or some other means, the microcomputer 105 interprets this as the input of a channel edit command by the user (S211).

If the channel edit command is not inputted by the user, the microcomputer 105 continues to display the broadcast signal of the default channel or the channel selected previously by the user on the display unit 110 (S214).

On the other hand, if the channel edit command (i.e., channel edit menu) is selected by the user, the microcomputer 105 displays a channel edit screen as shown in, e.g., FIG. 5 based on the channel information set in the memory 106 (S217).

At this time, the broadcast signals for the channel previously viewed (before the selection of the channel edit menu) and all other memorized (available) channels are displayed according to the moving-to-static picture process discussed above on the channel edit screen in the form of a multi-window 40 including a plurality of sub-windows 42 based on the set channel information (S220). In addition, a moving cursor is positioned at one of the sub-windows corresponding to the channel that has been viewed until the channel edit menu is selected.

Thereafter, the microcomputer 105 determines if a key or other user input is inputted by the user (S223). If no key is inputted by the user for some period, the process moves to step S241. If a user input or key is inputted by the user, it is determined whether the inputted key is an arrow key (hereafter a first selection key) (S229). The first selection keys are used to roll through different channels from the channel edit screen and to select a desired channel.

If the first selection key is inputted (i.e., a new channel selected), the microcomputer 105 controls the first tuner 101 to tune to this newly selected channel, so as to display the program of the newly selected channel on the corresponding sub-window 42 of the screen in moving pictures (S232).

Accordingly, the channel selected by the user at step S229 is tuned by the first tuner 101 to be displayed and all other channels are tuned by the second tuner 102 to be displayed.

If it is determined at step S229 that the key inputted by the user is not an arrow key, it is determined whether or not the inputted key is an edit key (hereinafter a second selection key) (S235). The edit key is used to control channel editing functions from the channel edit screen. If the second selection key is inputted, the microcomputer 105 controls to edit appropriate channel(s) according to the user's selections (S238). For instance, at step S238, a channel is memorized, deleted and/or set as a favorite channel according to the user's commands. This channel editing step is performed according to known techniques.

If the user inputs an edit end key, the channel edit process is terminated and the broadcast signal that has been viewed previously is displayed on the entire screen (without the multi-window) (S241).

In the related art, only the moving picture of a single channel selected by the user is displayed in the channel broadcast area 20 of the edit screen 24. In the present invention, however, a multi-window is created and displayed where programs on all available channels are simultaneously or substantially simultaneously displayed on the corresponding sub-windows. By viewing the multi-window then, the user can almost instantaneously recognize which channel is available, which channel is a favorite channel, a deleted channel and a memorized channel, which channel is currently selected, etc.

Figure 6:
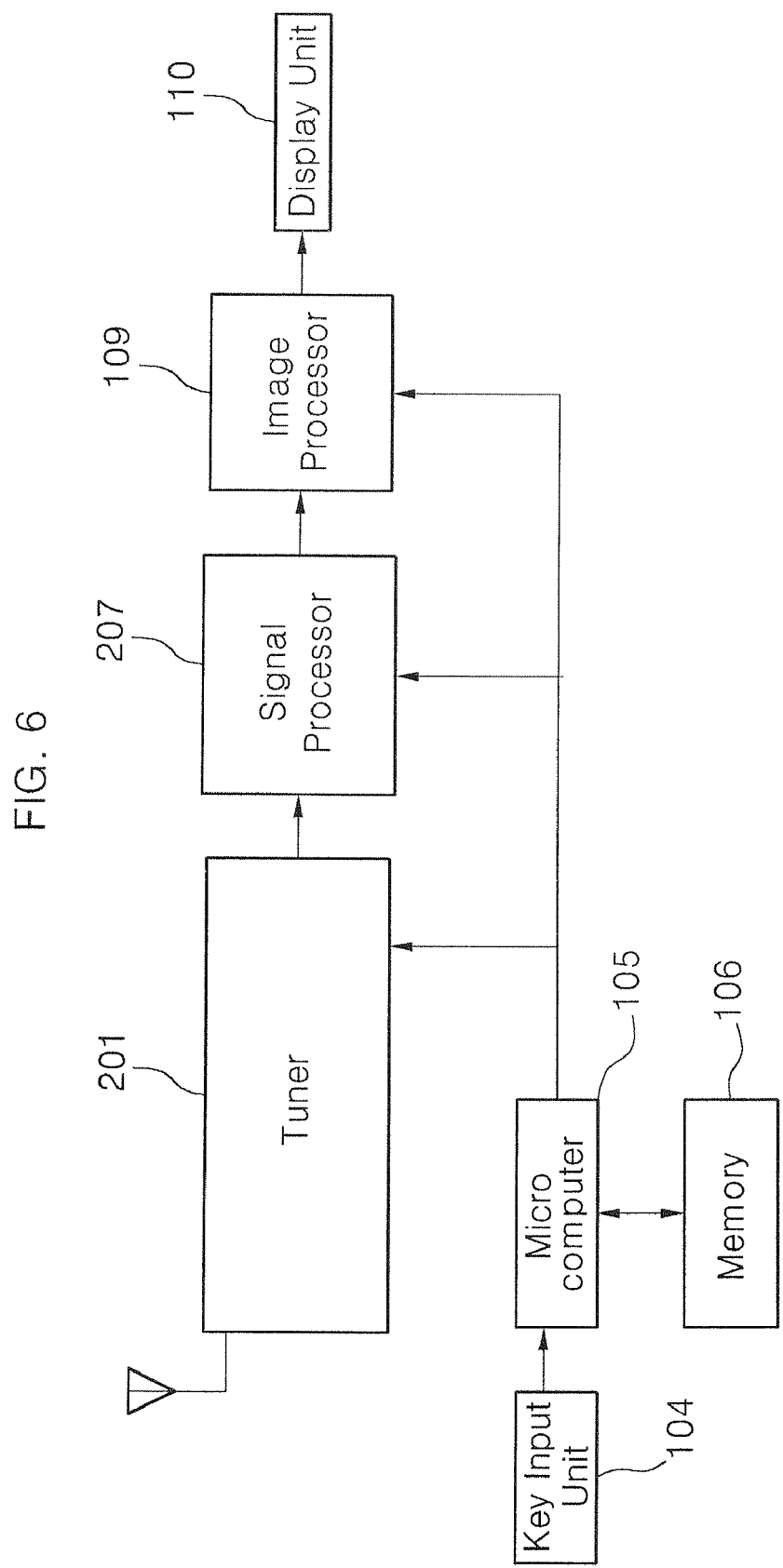
FIG. 6 is a block diagram of a digital TV according to a second embodiment of the present invention.

FIG. 6 is a block diagram of a digital TV according to the second embodiment of the present invention. In this embodiment, a single tuner is used to tune to all available channels including any user selected channel.

Referring to FIG. 6, the digital TV according to the second embodiment of the present invention includes: a single tuner 201 for tuning to different broadcast channels among the broadcast signals inputted through one or more antennas according to a user's request; a signal processor 207 for processing the broadcast signals of the tuner 201 into signals that can be displayed on a display unit 110; a key input unit (user input unit) 104 for inputting request commands of a user and any other inputs; a microcomputer (controller) 105 for outputting control signals in response to the commands of the user (e.g., a channel edit command, a channel edit execution command, etc.); a storage or memory 106 for storing standing (non-moving) pictures of channels tuned by the tuner 201 and set channel information; an image processor 109 for processing output signals of the signal processor 207 (e.g., under control of the microcontroller 105) to implement the output signals in the form of a multi-window or a single window; and a display unit 110 for outputting an image signal outputted by the image processor 109. All these components of the digital TV are operatively coupled.

In the second embodiment, when a user selects a channel edit menu, the tuner 201 tunes sequentially (or in some predetermined order) to all available channels including the currently selected channel by the user. The tuner 201 tunes sequentially to all available (memorized) channels so that the programs on those channels are displayed on the corresponding sub-windows of a multi-window first in moving pictures and then in static pictures for a time duration. For instance, the tuner 201 tunes to a first channel to display the first channel program in moving pictures on the corresponding sub-window. Then after a certain time duration has passed, the tuner 201 tunes to a second (next) channel to display the first channel program in static pictures on the corresponding sub-window and to display the second channel program in moving pictures on the corresponding sub-window. This is repeated for all available channels. If the user selects a particular channel from the channel edit screen, then the tuner 201 tunes to the selected channel so that the selected channel program is displayed in moving pictures on the corresponding sub-window, and all other available channels are displayed in static pictures on the corresponding sub-windows. At times where there is no channel selection, then the tuner 201 can be tuned to a designated channel (e.g., the last or first channel on the channel edit screen) so that the program on the designated channel is displayed in moving pictures while all other channels' programs are displayed in static pictures. All other operations (e.g., channel edit operations, etc.) are performed in the same manner as the first embodiment.

The microcomputer 105 controls the image signals outputted by the signal processor 207 so that they are displayed on the divided multi-window in response to a channel edit command or channel selection command inputted by the key input unit 104.

Figure 7:
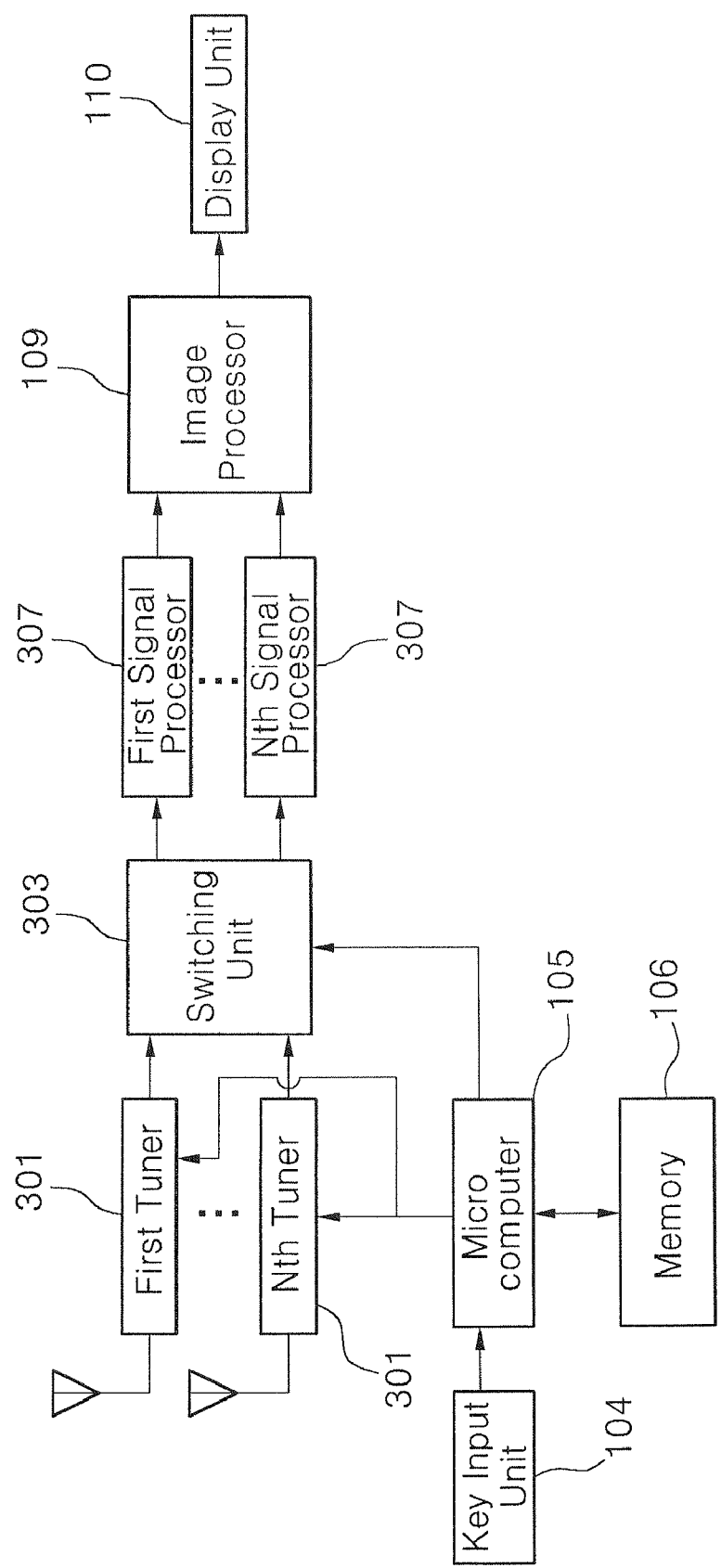
FIG. 7 is a block diagram of a digital TV according to a third embodiment of the present invention.

FIG. 7 is a block diagram of a digital TV according to the third embodiment of the present invention.

Referring to FIG. 7, the digital TV according to the third embodiment of the present invention includes: a plurality of tuners 301 each for tuning to a different broadcast channel among the broadcast signals inputted through one or more antennas according to a user's request; a switching unit 303 for selectively outputting the broadcast signals tuned by the tuners 301; a plurality of signal processors 307 for processing the broadcast signals of the tuners 301 selected by the switching unit 303 into signals that can be displayed on a display unit 110; a key input unit (user input unit) 104 for inputting request commands of a user and any other inputs; a microcomputer (controller) 105 for outputting control signals in response to the commands of the user (e.g., a channel edit command, a channel edit execution command, etc.) and controlling the elements of the digital TV; a storage or memory 106 for storing standing (non-moving) pictures of channels tuned by the tuner 301 and set channel information; an image processor 109 for processing output signals of the signal processors 307 according to the control signals of the microcomputer 105 to implement the output signals in the form of a multi-window or a single window; and a display unit 110 for outputting an image signal outputted by the image processor 109. All these components of the digital TV are operatively coupled. The tuners 301 are also referred to as a multi-tuner. If desired, the switching unit 303 may be omitted so that the signals from the tuners 301 are simultaneously supplied and processed by the signal processors 307, respectively, so that they can be displayed on the sub-windows simultaneously in moving pictures.

In this embodiment, the tuners 301 are configured to tune to all available channels, respectively, under control of the microcomputer 105. When a user selects a channel edit menu, each of the tuners 301 tunes to a different available channel such that the programs on all available channels are tuned simultaneously and displayed (selectively or almost simultaneously) in moving pictures on the corresponding sub-windows of the multi-window at a given time. If the user selects a particular channel from the channel edit screen, then the device can be configured to continuously display the program on the selected channel in moving pictures while displaying the programs on all other channels in static pictures. In another example, when the user selects a particular channel from the channel edit screen, all the programs are continuously displayed on the sub-windows in moving pictures, but the selected channel program is identified to the user using some known means such as with marks, highlights, bolding, etc.

In accordance with fourth, fifth and sixth embodiments of the present invention, the broadcast programs only for the favorite channels are displayed in the sub-windows of the multi-window. That is, the fourth, fifth and sixth embodiments correspond respectively to the first, second and third embodiments of the invention discussed above, except that the programs and channels displayed on the sub-windows of a multi-window are all user's favorite channels and not just available channels.

In accordance with the fourth embodiment, the favorite channel selected by the user is tuned by the first tuner 101 and displayed as a moving picture. All the other favorite channels not selected by the user are tuned automatically and sequentially (or in some order) by the second tuner 102 for a certain duration per channel and displayed first as moving pictures and then standing pictures according to the moving-to-static pictures process.

Figure 8:
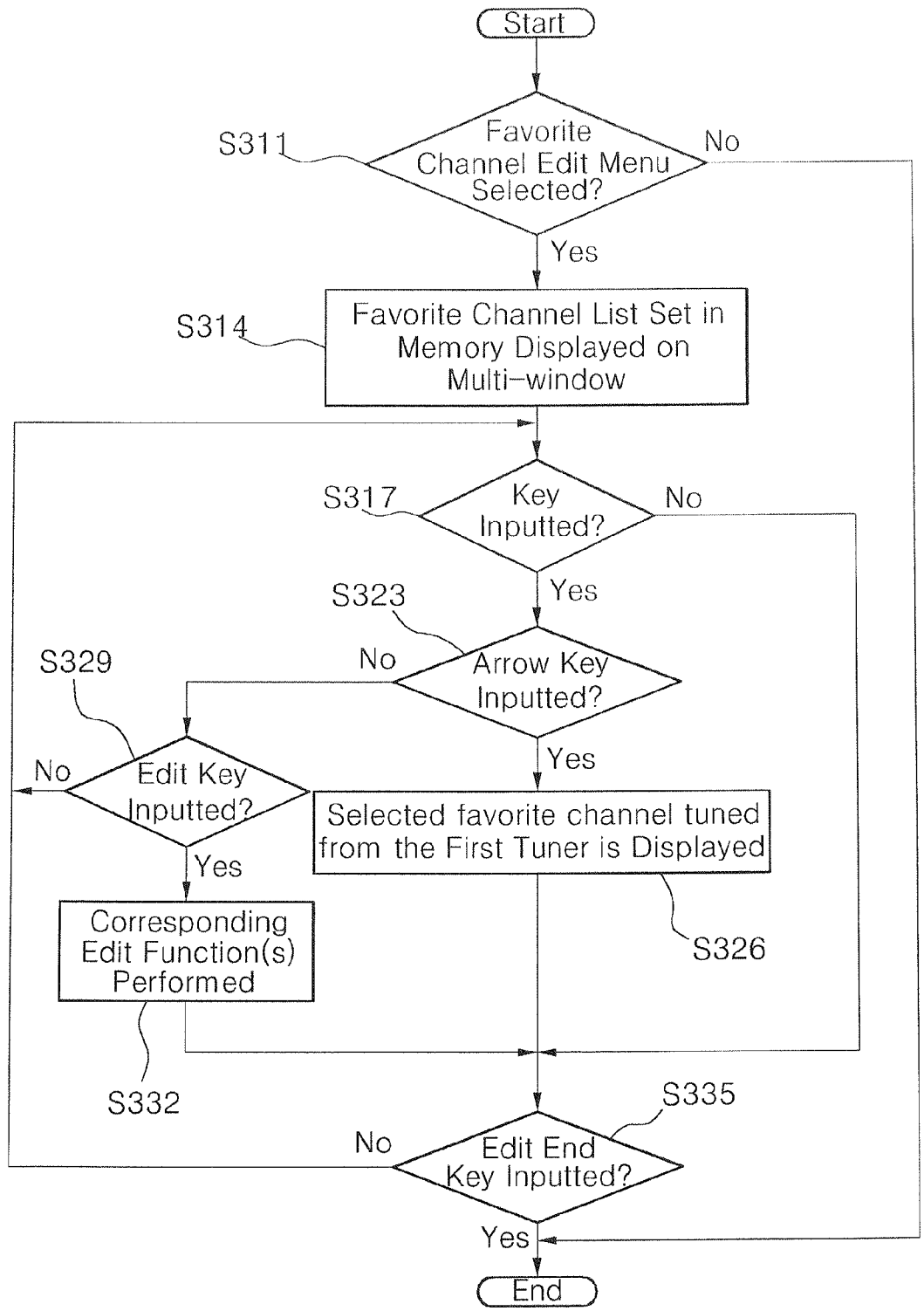
FIG. 8 illustrates a channel edit method of a digital TV according to a fourth embodiment of the present invention.

As an example, FIG. 8 illustrates a channel edit method of a display device according to the fourth embodiment of the present invention. This method can be implemented in the digital TV of FIG. 4A or other suitable device, and differs from the method of FIG. 4B in that this method of FIG. 8 involves displaying only the favorite channels on the sub-windows of the multi-window.

Referring to FIG. 8, it is determined whether a user selects a favorite channel menu (S311). If the user selects the favorite channel menu, the favorite channel list set in the memory 106 is displayed in the form of a multi-window including a plurality of sub-windows (S314). For instance, all the programs of the favorite channels are displayed on the corresponding sub-windows of the multi-windows. A default favorite channel or previously viewed favorite channel is shown continuously in moving pictures on the corresponding sub-window. All other favorite channels are automatically and sequentially (or in some order) displayed on the corresponding sub-windows according to the moving-to-static picture process. That is, one favorite channel program is shown in moving pictures for a certain duration while the previous adjacent favorite channel program is shown in static pictures, and so on. All non-selected favorite channel programs are displayed in this manner of the moving-to-static picture process.

In this example, if the channel, which was viewed before the favorite channel menu selection is made, is in the set favorite channel list, a moving cursor is positioned at that channel. If the channel, which was viewed before the favorite channel menu selection is made, is not in the set favorite channel list, a moving cursor is positioned at the left upper sub-window or some designated sub-window of the multi-window.

Then, it is determined whether or not the user inputs any key (user input) S317). If the user inputs a key, it is determined whether or not the key is an arrow key used to roll through the different favorite channels on the favorite channel edit menu and to select a desired favorite channel from the list of favorite channels (S323).

If the key inputted by the user is an arrow key, a new favorite channel selected by the user using the arrow key is tuned to by the first tuner 101 and displayed as a moving picture in the corresponding sub-window of the multi-window (S326).

On the other hand, if the key inputted by the user is not an arrow key, it is determined whether the inputted key is an edit key (S329). If the edit key is inputted, selected channels) are edited (e.g., memorized/deleted, etc.) (S332).

On the other hand, if the user does not input any key at step S317, the process moves to step S335. At step S335, it is determined whether a favorite channel edit end key/command is inputted by the user. If yes, then the favorite channel edit operation is terminated; but if no, then the process returns to step S317.

The fifth embodiment of the present invention is identical to the second embodiment, except that all channels displayed on the sub-windows are the user's favorite channels. The fifth embodiment can be implemented into the device of FIG. 6 or other suitable device.

In the fifth embodiment of the present invention, when a user selects a favorite channel edit menu, the tuner 201 tunes sequentially (or in some predetermined order) to all favorite channels of a user including the currently selected favorite channel (or previously viewed favorite channel) by the user to display a favorite channel edit screen. The favorite channel edit screen is identical to the screen shown in FIG. 5, except that all channels shown therein are the user's favorite channels. The tuner 201 tunes sequentially to all favorite channels of the user so that the programs on those favorite channels are displayed on the corresponding sub-windows of a multi-window first in moving pictures and then in static pictures for a time duration. For instance, the tuner 201 tunes to a first favorite channel to display the first favorite channel program in moving pictures on the corresponding sub-window. Then after a certain time duration has passed, the tuner 201 tunes to a second (next) favorite channel to display the first favorite channel program in static pictures on the corresponding sub-window and to display the second favorite channel program in moving pictures on the corresponding sub-window. This is repeated for all favorite channels of the user.

If the user selects a particular favorite channel from the favorite channel edit screen, then the tuner 201 tunes to the selected favorite channel so that the selected favorite channel program is displayed in moving pictures on the corresponding sub-window, and all other favorite channels are displayed in static pictures on the corresponding sub-windows. At times where there is no channel selection, then the tuner 201 can be tuned to a designated favorite channel (e.g., the last or first favorite channel on the favorite channel edit screen) so that the program on the designated channel is displayed in moving pictures while all other favorite channels' programs are displayed in static pictures. All other operations (e.g., channel edit operations, etc.) are performed in the same manner as the second embodiment.

The sixth embodiment of the present invention is identical to the third embodiment of the present invention, except that all channels displayed on the sub-windows are a user's favorite channels. The sixth embodiment can be implemented into the device of FIG. 7 or other suitable device.

In the sixth embodiment, the tuners 301 (multi-tuner) are configured to tune to all favorite channels of a user, respectively, under control of the microcomputer 105. When a user selects a favorite channel edit menu, each of the tuners 301 tunes to a different favorite channel of the user such that the programs on all the user's favorite channels are tuned simultaneously and displayed (selectively or almost simultaneously) in moving pictures on the corresponding sub-windows of the multi-window on a favorite channel edit screen, at a given time. The favorite channel edit screen is identical to the screen shown in FIG. 5, except that all channels shown therein are the user's favorite channels.

If the user selects a particular favorite channel from the favorite channel edit screen, then the device can be configured to continuously display the program on the selected favorite channel in moving pictures while displaying the programs on all other favorite channels in static pictures. In another example, when the user selects a particular favorite channel from the favorite channel edit screen, all the programs on all the favorite channels are continuously displayed on the sub-windows in moving pictures, but the selected favorite channel program is identified to the user using some known means such as with marks, highlights, bolding, etc.

In the above discussed embodiments of the present invention, when a channel program is first displayed in moving pictures on the corresponding sub-window and then switched to static pictures after a certain duration, this duration can be short enough such that the user views programs on all available/favorite channels simultaneously or almost simultaneously on the sub-windows of a multi-window. Also, as shown in FIG. 5, different tabs 50 can be provided to display programs or videos from different sources. FIG. 5 shows programs from a TV source as indicated by the activated "TV" tab 50.

As mentioned above, the digital TVs and the channel edit methods according to the present invention have the following advantages.

First, since a channel edit screen is configured in a multi-window, the broadcast status of all relevant channels including the selected channels, favorite channels and unavailable channels can be recognized almost instantaneously.

Second, the previously memorized channel can be compared with the currently memorized channel for the user to recognize more easily whether or not the broadcast is on.

Third, since the broadcast signal of each available channel is displayed on the multi-window, the user can recognize quickly those channels without the broadcast signals.

Fourth, in accordance with the fourth, fifth and sixth embodiments of the present invention, since only the favorite channels except for all other channels can be edited, the user can set more easily the user's favorite channel(s) suitable for his or her request or preferences.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for displaying images using a display device, the display device including a memory, a display screen, and a controller for controlling the memory and the display screen, the method comprising:

storing, in the memory, a favorite channel list and channel information pertaining to a predetermined number of broadcast channels;

receiving a request for a favorite channel menu; and in response to the favorite channel menu request, displaying, on the display screen, a multi-window including a plurality of sub-windows, each of the plurality of sub-windows configured to display images from a different one of the broadcast channels, the plurality of sub-windows including a first channel window for displaying contents currently received through a selected broadcast channel, a second channel window for displaying contents received through an available broadcast channel in which a broadcast signal was detected, and a third channel window for displaying channel information of a not-available broadcast channel in which a broadcast signal was not detected, wherein if a specific broadcast channel that was displayed before the favorite channel menu request is received is in the favorite channel list, a pointer is positioned at the sub-window corresponding to the specific broadcast channel, whereas if the specific broadcast channel that was displayed before the favorite channel menu request is received is not in the favorite channel list, the pointer is positioned at another location of the multi-window, wherein a number of the sub-windows displayed on the display screen is variable according to the channel information, wherein the third channel window displays a channel number of the not-available broadcast channel without contents, wherein a broadcast channel selected by a user is displayed using the first channel window, wherein each of one or more broadcast channels not selected by the user is displayed using one of the second and third channel windows, and wherein when broadcast signal is no longer detected in the available broadcast channel, the second channel window is changed to display a channel number of a corresponding channel without contents.

2. The method of claim 1, wherein the number of the sub-windows displayed on the display screen corresponds to the predetermined number of the broadcast channels.

3. The method of claim 1, further comprising:

varying the predetermined number of the broadcast channels according to the user's input.

4. The method of claim 3, wherein the number of the sub-widows displayed on the display screen is changed to match the varied number of the broadcast channels.

5. The method of claim 1, wherein the broadcast channels are favorite channels.

6. The method of claim 1, wherein one of the sub-windows displays a moving image of a selected one of the broadcast channels, continuously.

7. The method of claim 6, wherein at least another of the sub-windows displays a moving image of another one of the broadcast channels for a time duration, and then displays said moving image in a still image form.

8. The method of claim 1, wherein the not-available broadcast channel in which the broadcast signal was not detected is a broadcast channel not selected by the user, such that the third channel window displays the channel number of the not-available and not-user selected broadcast channel without contents.

9. A display device for displaying images, comprising:

a memory configured to store a favorite channel list and channel information pertaining to a predetermined number of broadcast channels;

a display screen configured to display, in response to a receipt of a request for a favorite channel menu, a multi-window including a plurality of sub-windows, each of the plurality of sub-windows configured to display images from a different one of the broadcast channels a first channel window for displaying contents currently received through a selected broadcast channel, a second channel window for displaying contents received through an available broadcast channel in which a broadcast signal was detected, and a third channel window for displaying channel information of a not-available broadcast channel in which a broadcast signal was not detected, wherein if a specific broadcast channel that was displayed before the favorite channel menu request is received is in the favorite channel list, a pointer is positioned at the sub-window corresponding to the specific broadcast channel, whereas if the specific broadcast channel that was displayed before the favorite channel menu request is received is not in the favorite channel list, the pointer is positioned at another location of the multi-window; and a controller configured to control the memory and the display screen, wherein a number of the sub-windows displayed on the display screen is variable according to the channel information, wherein the third channel window displays a channel number of the not-available broadcast channel without contents, wherein a broadcast channel selected by a user is displayed using the first channel window, wherein each of one or more broadcast channels not selected by the user is displayed using one of the second and third channel windows, and wherein when broadcast signal is no longer detected in the available broadcast channel, the second channel window is changed to display a channel number of a corresponding channel without contents.

10. The display device of claim 9, wherein the number of the sub-windows displayed on the display screen corresponds to the predetermined number of the broadcast channels.

11. The display device of claim 9, wherein the controller is further configured to vary the predetermined number of the broadcast channels according to the user's input.

12. The display device of claim 11, wherein the number of the sub-widows displayed on the display screen is changed to match the varied number of the broadcast channels.

13. The display device of claim 9, wherein the broadcast channels are favorite channels.

14. The display device of claim 9, wherein one of the sub-windows displays a moving image of a selected one of the broadcast channels, continuously.

15. The display device of claim 14, wherein at least another of the sub-windows displays a moving image of another one of the broadcast channels for a time duration, and then displays said moving image in a still image form.

16. The display device of claim 14, wherein the not-available broadcast channel in which the broadcast signal was not detected is a broadcast channel not selected by the user, such that the third channel window displays the channel number of the not-available and not-user selected broadcast channel without contents.

* * * * *